3,116,315
TERTIARY PHOSPHINE OXIDES

Michael M. Rauhut, Norwalk, Conn., assignor to American Cyanamid Company, New York, N.Y., a corporation of Maine
No Drawing. Filed July 21, 1961, Ser. No. 125,639
3 Claims. (Cl. 260—465)

The present invention relates to novel tertiary phosphine oxides. More particularly, the instant discovery concerns monocarbamoyl-substituted tertiary phosphine oxides.

According to the present invention, novel tertiary phosphine oxides of the formula

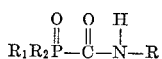

which phosphine oxides are useful as flame retardants when applied to cotton cloth, or the like, are prepared from isocyanates of the formula RNCO and secondary phosphine oxides of the formula

R in the above formulae represents aryl, substituted and unsubstituted; $R_1$ and $R_2$ each represent substituted and unsubstituted, saturated and unsaturated, branched and straight chain alkyl having from 1 to 18 carbon atoms, substituted and unsubstituted cycloalkyl, such as cyclohexyl and cyclopentyl, substituted and unsubstituted aryl, such as phenyl and naphthyl.

Pursuant to a typical embodiment of the instant invention, the following reaction is made to take place:

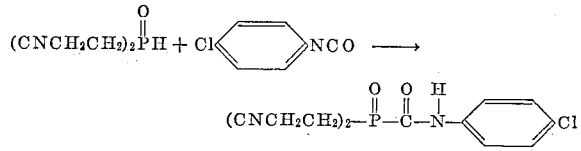

Reaction is best carried out in the presence of an inert organic solvent, such as an aromatic hydrocarbon, an ether, a halogenated hydrocarbon, or the like. Typical inert organic solvents are xylene, benzene, toluene, tetrahydrofuran, dioxane, chlorbenzene, chloroform, and the like.

Reaction may be made to take place at superatmospheric, atmospheric, or sub-atmospheric pressure, preferably at atmospheric pressure. The sequence of addition is not critical, and the reaction may be performed under batch, continuous or semi-batch conditions. A wide range of temperatures may be employed, excellent results being achieved at ambient temperature. While temperatures in the range of 30° C. to 110° C. are preferred, temperatures as low as −15° C. and as high as 200° C. may be used.

Typical isocyanate reactants contemplated herein are aryl isocyanates, such as phenyl isocyanate, para-chlorophenyl isocyanate, 2,5-dichlorophenyl isocyanate, para-nitrophenyl isocyanate, meta-tolyl isocyanate, orthochlorophenyl isocyanate, para-methoxyphenyl isocyanate, meta-nitrophenyl isocyanate, 1-naphthyl isocyanate, 2-naphthyl isocyanate, and the like. It can be seen that typical inert substituents for the aryl isocyanates contemplated herein are lower alkyl, nitro, lower alkoxy, halogen (e.g. chlorine, bromine, etc.), and the like.

If desired, organic basic catalysts, including pentamethylguanidine, tertiary amines, such as trialkyl ($C_1$–$C_4$) amines may be employed to enhance the reaction contemplated herein. Only small amounts of these catalysts need be employed, i.e., amounts up to about 10 percent by weight based on the total weight of the reactants. As little as 0.05 percent by weight or less will often be helpful.

The present invention will be illustrated hereinafter by examples which are intended to further describe, not limit, the scope of the invention.

EXAMPLE I

A solution of 5.0 grams (0.029 mole) of bis(2-cyanoethyl)phosphine oxide, 4.9 grams (0.032 mole) of para-chlorophenylisocyanate, and 5 drops of triethylamine in 45 milliliters of chloroform is refluxed for 30 minutes. The reaction mixture is cooled and filtered, and the white solid is recrystallized from chloroform; 6.0 grams of para-chlorophenylcarbamylbis(2-cyanoethyl)phosphine oxide, melting point 145° C., is obtained.

EXAMPLES II–VIII

The following tabulated examples are carried out essentially as in Example I, above, the essential reaction condition differences being specified in the table:

*Table 1*

| Example | Reactants | | Catalyst | Ratio, Phosphine: Isocyanate | Temperature, ° C. | Solvent | Product | | |
|---|---|---|---|---|---|---|---|---|---|
| | Phosphine Oxide | Isocyanate | | | | | $R_1$ | $R_2$ | R |
| II | diethylphosphine oxide. | para-chlorophenyl isocyanate. | tributylamine. | 1:1 | 30 | xylene | ethyl | ethyl | para-chlorophenyl. |
| III | dioctylphosphine oxide. | 2,5-dichlorophenyl isocyanate. | trimethylamine. | 1:2 | 40 | tetrahydrofuran | octyl | octyl | 2,5-dichlorophenyl. |
| IV | didodecylphosphine oxide. | para-nitrophenyl isocyanate. | tributylamine. | 1.5:1 | 65 | dioxane | dodecyl | dodecyl | para-nitrophenyl. |
| V | diisopropylphosphine oxide. | meta-tolyl isocyanate. | tripropylamine. | 1:1 | 90 | toluene | isopropyl | isopropyl | meta-tolyl. |
| VI | dicyclohexylphosphine oxide. | para-methoxyphenyl isocyanate. | triethylamine. | 1:4 | 50 | dimethylformamide | cyclohexyl | cyclohexyl | para-methoxyphenyl |
| VII | dicyclopentylphosphine oxide. | 1-naphthyl isocyanate. | pentamethylguanidine. | 2:1 | 22 | chloroform | cyclopentyl | cyclopentyl | 1-naphthyl. |
| VIII | dioctadecylphosphine oxide. | para-bromophenyl isocyanate. | do | 1:2 | 25 | perchloroethane | octadecyl | octadecyl | para-bromophenyl. |

EXAMPLES X–XXIII

The following tabulated reactions are carried out essentially as in Example I, above, the essential differences in reaction conditions being specified in the table:

Table II $$R_1R_2\overset{O}{\overset{\|}{P}}H + RNCO \longrightarrow R_1R_2\overset{O}{\overset{\|}{P}}-\overset{O}{\overset{\|}{C}}-\overset{H}{\overset{|}{N}}-R$$

| Example | Reactants | | Catalyst | Ratio, Phosphine: Isocyanate | Temperature, °C. | Solvent | Product | | |
|---|---|---|---|---|---|---|---|---|---|
| | Phosphine Oxide | Isocyanate | | | | | $R_1$ | $R_2$ | R |
| X | dimethylphosphine oxide. | phenyl isocyanate. | tributylamine. | 1:1 | 50 | benzene | methyl | methyl | phenyl. |
| XI | dioctylphosphine oxide. | meta-chlorophenyl isocyanate. | ---------- | 1:2 | 60 | diethyl-ether | octyl | octyl | meta-chlorophenyl. |
| XII | didodecylphosphine oxide. | para-methylphenyl isocyanate. | triethylamine. | 3:1 | 100 | toluene | dodecyl | dodecyl | para-methylphenyl. |
| XIII | diisobutylphosphine oxide. | para-fluorophenyl isocyanate. | tripropylamine. | 1:1 | 35 | chloroform | isobutyl | isobutyl | para-fluorophenyl. |
| XIV | diethylphosphine oxide. | meta(trifluoromethyl) isocyanate. | tributylamine. | 1:1 | 55 | $CH_3OCH_2CH_2OCH_3$ | ethyl | ethyl | meta(trifluoromethyl)phenyl. |
| XV | bis(trifluoromethyl)phosphine oxide. | 2-naphthyl isocyanate. | ---------- | 1:2 | 70 | benzene | trifluoromethyl | trifluoromethyl | 2-naphthyl. |
| XVI | diphenylphosphine oxide. | meta-bromophenyl isocyanate. | triethylamine. | 2:1 | 82 | ----do---- | phenyl | phenyl | meta-bromophenyl. |
| XVII | dibenzylphosphine oxide. | phenyl isocyanate. | ---------- | 1:1 | 85 | ----do---- | benzyl | benzyl | phenyl. |
| XVIII | bis(2-butoxyethyl)phosphine oxide. | para-methylphenyl isocyanate. | tributylamine | 1.5:2 | 95 | toluene | 2-butoxyethyl | 2-butoxyethyl | para-methylphenyl. |
| XIX | bis(para-chlorophenyl)phosphine oxide. | phenyl-isocyanate. | tripropylamine. | 1:1 | 65 | chloroform | parachlorophenyl | parachlorophenyl | Do. |
| XX | bis(para-methylphenyl)phosphine oxide. | ----do---- | triethylamine. | 1:1 | 80 | benzene | paramethylphenyl | paramethylphenyl | Do. |
| XXI | divinylphosphine oxide. | ----do---- | ---------- | 1:1 | 63 | ----do---- | vinyl | vinyl | Do. |
| XXII | 2-cyanoethyl-(1-octenyl)phosphine oxide. | ----do---- | triethylamine. | 1:2 | 79 | ----do---- | 2-cyanoethyl | 1-octenyl | Do. |
| XXIII | butyl(1-dodecenyl)phosphine oxide. | ----do---- | tributylamine. | 1:1.5 | 100 | ----do---- | butyl | 1-dodecenyl | Do. |

It follows from the above representative examples that typical substituents for the secondary phosphine oxide reactants are lower alkyl, phenyl, halogen, lower alkoxy, cyano, and the like. Characteristically, these and like substituents are inert under the reactions contemplated herein.

The products of the present invention are useful as fire retardants for cotton cloth, as indicated hereinabove. For example, cotton cloth dipped, according to well-known procedures, in a suitable solution of any one of these monocarbamyl-substituted tertiary phosphines manifests desirable fire retardance.

Clearly, the instant discovery encompasses numerous modifications within the skill of the art. Consequently, while the present invention has been described in detail with respect to specific embodiments thereof, it is not intended that these details be construed as limitations upon the scope of the invention, except insofar as they appear in the appended claims.

I claim:
1. A tertiary phosphine oxide of the formula

$$R_1R_2\overset{O}{\overset{\|}{P}}-\overset{O}{\overset{\|}{C}}-\overset{H}{\overset{|}{N}}-R$$

wherein R is a member selected from the group consisting of phenyl, naphthyl, and substituted phenyl, said substituents for phenyl being selected from the group consisting of lower alkyl, nitro, lower alkoxy and halogen; $R_1$ and $R_2$ each represent a member selected from the group consisting of alkyl having from 1 to 18 carbon atoms, alkenyl having from 1 to 18 carbon atoms, substituted alkyl having from 1 to 18 carbon atoms, cyclohexyl, cyclopentyl, phenyl, substituted phenyl, naphthyl and substituted naphthyl, said substituents for alkyl being selected from the group consisting of halogen, phenyl, lower alkoxy and cyano, and said substituents for phenyl and naphthyl being selected from the group consisting of lower alkyl, halogen, lower alkoxy and cyano.

2. Para-chlorophenylcarbamylbis(2-cyanoethyl)-phosphine oxide.

3. Dibutyl(1-naphthylcarbamoyl)phosphine oxide.

References Cited in the file of this patent

UNITED STATES PATENTS 2,971,019   Ladd et al, _____ Feb. 7, 1961

UNITED STATES PATENT OFFICE
CERTIFICATE OF CORRECTION

Patent No. 3,116,315            December 31, 1963

Michael M. Rauhut

It is hereby certified that error appears in the above numbered patent requiring correction and that the said Letters Patent should read as corrected below.

Columns 3 and 4, Table II, Example XIX, under the heading "R" for "Do" read -- phenyl --; same table, Example XXIII, under the heading "$R_2$" for "1-dodecenyl cenyl" read -- 1-dodecenyl --.

Signed and sealed this 30th day of June 1964.

(SEAL)
Attest:

ERNEST W. SWIDER            EDWARD J. BRENNER
Attesting Officer            Commissioner of Patents